US008713138B1

(12) United States Patent
Machiraju et al.

(10) Patent No.: US 8,713,138 B1
(45) Date of Patent: Apr. 29, 2014

(54) EXTENSIBLE FRAMEWORK FOR CLIENT-BASED ACTIVE NETWORK MEASUREMENT

(75) Inventors: Sridhar Machiraju, Oakland, CA (US); Jean Chrysostome Bolot, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 923 days.

(21) Appl. No.: 11/464,778

(22) Filed: Aug. 15, 2006

(51) Int. Cl.
*G06F 15/177* (2006.01)

(52) U.S. Cl.
USPC .......................................... 709/221; 709/223

(58) Field of Classification Search
None
See application file for complete search history.

(56) References Cited

U.S. PATENT DOCUMENTS 5,062,055 A * 10/1991 Chinnaswamy et al. ..... 702/182
5,574,374 A * 11/1996 Thompson et al. ........... 324/338
6,047,323 A * 4/2000 Krause .......................... 709/227
6,763,380 B1 * 7/2004 Mayton et al. ................ 709/224
6,868,094 B1 * 3/2005 Bordonaro et al. ........... 370/516
6,904,020 B1 * 6/2005 Love et al. .................... 370/252
6,968,375 B1 * 11/2005 Brown .......................... 709/224
7,512,128 B2 * 3/2009 DiMambro et al. .......... 370/393
7,523,190 B1 * 4/2009 Bickerstaff et al. ........... 709/224
2008/0104231 A1 * 5/2008 Dey et al. ...................... 709/224
2009/0019536 A1 * 1/2009 Green et al. .................... 726/12

OTHER PUBLICATIONS

Neil Spring, David Wetherall & Tom Anderson; Scriptroute: A Public Internet Measurement Facility; Department of Computer Science & Engineering, University of Washington.
Stefan Savage; Sting: a TCP-based Network Measurement Tool; Department of Computer Science & Engineering; University of Washington.
Vern Paxson, Andrew K. Adams & Matt Mathis; Experiences with NIMI.
Rude & Crude [current version is 0.70] Hosted by SourceForge.net (http://rude.soruceforge.net/).

* cited by examiner

*Primary Examiner* — Viet Vu
*Assistant Examiner* — Keyvan Emdadi

(57) ABSTRACT

A method, system, medium and a lightweight computing framework are provided for active network measurements. A communication network having links that connect a collection of client devices that utilize the computing framework to generate probe streams, receive network data associated with one or more network measurements, and to analyze the network data. The probe streams are generated based on a configuration file. The configuration file implements one or more network measurements and is defined in a scripting language. Additionally, the probe streams collect network data, and the computing framework utilizes the network data to determine link properties along one or more communication paths and to generate additional probe streams when specified conditions are satisfied.

14 Claims, 9 Drawing Sheets

113 100 112 111 110 150 160 NETWORK 140 130 120 122a1 122 SERVICE 122a CONTROL 121 122a2

| CONTROL COMMANDS | | |
|---|---|---|
| COMMAND | ARGUMENTS | DESCRIPTION |
| CONNECT | PORT ADDRESS | CONNECT TO SERVICE ON SPECIFIED PORT |
| DISCONNECT | | DISCONNECT |
| USE | | SEND NEXT COMMAND TO HOST ID |
| DATA | ID LIST | COLLECT DATA FROM STREAM AND STORE IN FILE |
| CONTDATA | OUTPUT INTERFACE | OUTPUT CONTINUOUS DATA TO SPECIFIED INTERFACE |

FIG. 5

| SERVICE STREAM COMMANDS | | |
|---|---|---|
| COMMAND | ARGUMENTS | DESCRIPTION |
| STREAM | ID, TYPE, PRC | DECLARES STREAM WITH ID |
| START | ID LIST | START THE LIST OF STREAMS STOPS WHEN ALL ARE DONE |
| WAIT | ID LIST | SAMES AS START; STOPS ON NEW COMMAND OR WHEN ALL ARE DONE |
| REMOVE | ID LIST | REMOVE LIST OF STREAMS |
| RESET | ID LIST | AVOIDS REPEATED STREAM CONFIGURATION |

FIG. 6

| SENDING STREAMS CONFIGURATION COMMANDS | | |
|---|---|---|
| COMMANDS | ARGUMENTS | DESCRIPTION |
| DEST | ADDRESS | DESTINATION ADRESS |
| IDT | RANDOM OBJECT | RANDOMIZE INTER-DEPARTURE TIMES |
| SIZE | RANDOM OBJECT | RANDOMIZE SIZE OF STREAMS TO SEND |
| TTL OR TOS | RANDOM OBJECT | RANDOMIZE TIME TO LIVE OR TPE OF SERVICE |
| SELFISH | ON OR OFF | EXCLUSVIE USE OF CPU |
| PORT OR TYPE | RANDOM OBJECT | RANDOMIZE SENDING PORT OR STREAM TYPE |
| PAYLOADPROTO | DIVESE DATA AND OPTIONS | SPECIFY CONTENTS AND OPTIONS FOR STREAM PAYLOAD |

FIG. 7

| RANDOM NUMBER GENERATOR | | |
|---|---|---|
| COMMAND | ARGUMENT | DESCRIPTION |
| EXP | MEAN | EXPONENTIALLY DISRTRIBUTED |
| UNIF | MIN AND MAX | UNIFORMLY DISTRIBUTED |
| CONSTANT | VALUE | CONSTANT |
| LIST | VALUES | LIST OF VALUES |
| TRACE | FILENAME | VALUES FROM TRACE FILE |

FIG. 8

| RECEIVING STREAMS CONFIGURATION COMMANDS | | |
|---|---|---|
| COMMAND | ARGUMENT | DESCRIPTION |
| SOURCE | ADDRESS | OPTIONAL |
| PORT OR TYPE | NUMBER | RECEIVING PORT OR STREAM TYPE |

FIG. 9

| ALL STREAMS CONFIGURATION COMMANDS | | |
|---|---|---|
| COMMAND | ARGUMENT | DESCRIPTION |
| DURATION | TIME | MAXIMUM STREAM DURATION |
| MAXNUM | NUMBER | MAXIMUM NUMBER OF STREAMS SENT OR RECEIVED |
| STAGGERSTAT | RANDOM OBJECT | RANDOMIZE START TIME |
| CONTDATA | ON/OFF | DATA OUTPUT FOR EACH PACKET |

SCRIPT INTERFACE

1110

```
# Connect to pathstar-service
host 1 connect 1500 127.0.0.1
# Listen for Echo-reply messages.
stream 1 recv icmp ping-receiver
contdata on
type 0
# Send Echo-request messages too.
stream 2 send icmp ping-sender
contdata off
dest www.usenix.org
# ICMP Echo Solicitation Type
type 8
# 1 ICMP packet of 1500 bytes every 1 second.
idt constant 1
size constant 1500
# Start
start all
host 1 contdata ping-helper.pl
```

EDIT 1120

FINISH 1130

FIG. 11

EXTENSIBLE FRAMEWORK FOR CLIENT-BASED ACTIVE NETWORK MEASUREMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Conventionally, network measurement tools are utilized by network operators to check compliance with service level agreements and users to measure network performance. The network measurement tools provide information regarding connectivity, routing, link capacities, available bandwidth, and bottlenecks. Typically, different tools are required to gather the information utilized by the network operators to ensure compliance.

For instance, a network operator may utilize a first tool to measure capacity and a second tool to measure delay. Additionally, a third tool may be utilized to measure bandwidth. In operation, multiple tools create numerous inefficiencies in code portability, code maintenance and implementation. Each tool reimplements basic functionality such as packet scheduling, timestamping and receiving. Reimplementation of basic functionality creates implementation inefficiencies because each of the three tools executes similar lower level procedures. In a similar vein, code maintenance is inefficient because each tool is updated separately, which requires duplicative update procedures. Moreover, portability is inefficient because each tool is tied to the underlying computing platform or operating system. Additionally, the network operator would be burdened to understand three interfaces associated with the three different tools.

SUMMARY

The present invention is defined by the claims below. Embodiments of the present invention solve at least the above problems by providing a system, method, computer-readable media and computing framework for, among other things, performing distributed active network measurement. The present invention has several practical applications in the technical arts including dynamically configuring and extending active network measurements, debugging active network measurements and providing link and path properties.

In a first aspect, a computer-implemented method for active network measurement is provided. The method includes receiving a configuration file associated with one or more active network measurements. The configuration file is parsed to extract specified commands. In turn, a collection of probe streams are generated and injected into a communication network. The probe streams provide network data that is utilized to estimate path properties, such as capacity, bandwidth, round trip time, etc.

In a second aspect, a computer system for active network measurements is provided. The system includes a collection of client devices having service and control components for active network measurement. Additionally, the system includes a script interface that provides commands associated with one or more active network measurement procedures. Network data corresponding to the one or more active network measurements is collected along one or more communication links associated with one or more of the collection of client devices connected to a communication network.

In a third aspect, one or more client devices execute a lightweight computing framework for extensible active network measurements. The computing framework includes sending, receiving, analysis and output components. The sending component generates probe streams based on commands included in an active network measurement configuration file. The receiving component receives network data corresponding to the probe streams, and the analysis component utilizes the network data to estimate link properties. The output component provides the network data or path properties to an appropriate output interface that may be specified in the active network measurement configuration file.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 is a table illustrating control commands implemented by the extensible computing framework, according to an embodiment of the present invention;

FIG. 6 is a table illustrating service commands implemented by the extensible computing framework, according to embodiments of the present invention;

FIG. 7 is a table illustrating a first set of probe stream configuration commands implemented by the extensible computing framework, according to embodiments of the present invention;

FIG. 8 is a table illustrating random number generator commands implemented by the extensible computing framework, according to embodiments of the present invention;

FIG. 9 is a table illustrating a second set of probe stream configuration commands implemented by the extensible computing framework, according to an embodiment of the present invention;

FIG. 10 is a third set of probe stream configuration commands implemented by the extensible computing framework, according to an embodiment of the present invention;

FIG. 11 is a screen shot illustrating a script interface for configuring the probe streams, according to an embodiment of the present invention.

DETAILED DESCRIPTION

Figure 1:
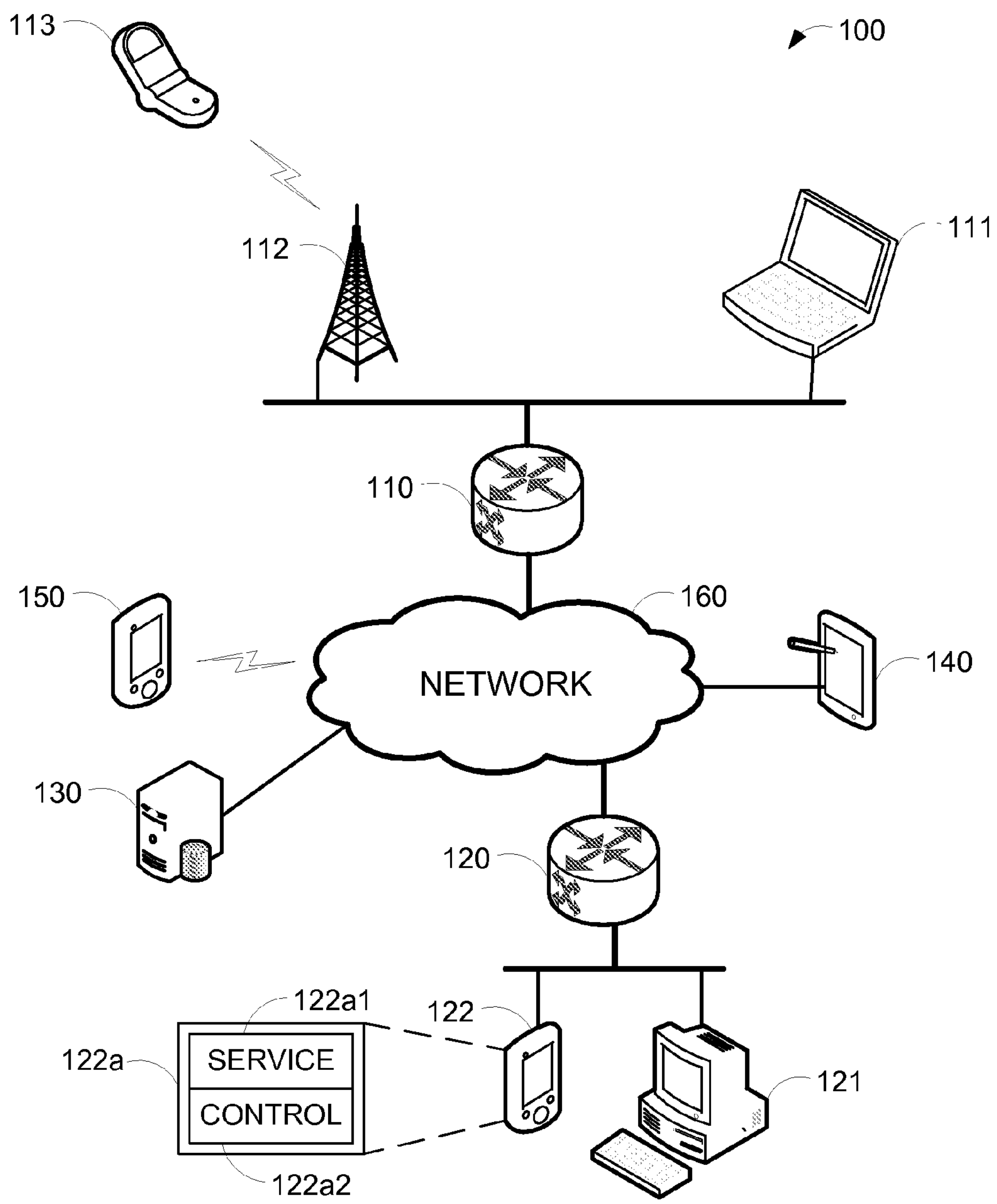
FIG. 1 is a network diagram illustrating a distributed operating environment, according to an embodiment of the present invention.

Embodiments of the present invention provide computer-readable media, computing frameworks, computer systems and methods for performing active network measurement utilizing a one-invocation-per-technique paradigm. Specifically, an extensible computing framework for active network measurements is utilized to generate probe streams that collect network data. The extensible computing framework provides implementations for basic primitives and a script interface where scripts are utilized to invoke the basic primitives. The extensible computing framework facilitates updates and new configurations for active network measurement that are dynamically ported to clients on a communication network. Accordingly, end users, or network operators have a simple, lightweight, and extensible computing framework to efficiently set up and operate a wide panoply of active probing techniques for measuring network data.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| API | Application programming interface |
| HTTP | Hypertext Transport Protocol |
| ICMP | Internet Control Message Protocol |
| IP | Internet Protocol |
| RTP | Realtime Transport Protocol |
| TCP | Transmission Control Protocol |
| TOS | Type of Service |
| TTL | Time to Live |
| UDP | User Datagram Protocol |
| VPN | Virtual Private Network |

As utilized herein, a component refers to any combination of hardware and software. Moreover, computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of communication media.

In an embodiment, a distributed operating environment may utilize an extensible computing framework for active network measurement to collect network data associated with client devices connected in a communication network. The communication network provides access among the client devices and enables wired or wireless communications. FIG. 1 is a network diagram illustrating a distributed operating environment 100, according to an embodiment of the present invention. One of ordinary skill in the art appreciates that operating environment 100 has been simplified to illustrate key features of embodiments of the present invention.

In FIG. 1, the distributed operating environment 100 includes a communication network 160, a base station 112, network switches 110 and 120, server device 130 and a collection of client devices 111, 113, 121, 122, 140 and 150 configured with an extensible computing framework **122*a*. The client devices include a mobile phone 113, a laptop 111, personal digital assistants 122 and 150, a workstation 121 and a tablet personal computer 140. The server device 130 provides access to files or web pages. The network switches 110 and 121 route communications across the communication network 160. The base station 112 provides the mobile phone 113 access to the communication network 160. In an embodiment of the invention, the communication network is a virtual private network (VPN) that provides tunnels for client devices 111, 113, 121, 122, 140 and 150**.

The extensible computing framework **122*a* as illustrated in client device 122 includes a service component 122*a*1 and a control component 122*a*2. The extensible computing framework 122*a* enables active network measurements on the communication network 160. Network data associated with the communication network 160 is provided to each client device 111, 113, 121, 122, 140 and 150. The network data is then analyzed by the client device 122 to determine path properties, such as bandwidth, capacity, delay, connectivity, bottlenecks, etc. In an embodiment of the invention, analysis of the network data is distributed across the collection of client devices 111, 113, 121, 122, 140 and 150**.

The service component **122*a*1 may operate in a library or daemon mode. The extensible computing framework 122*a* listens for requests on a specified port of the client device 122 and may operate in library or daemon mode. In an embodiment, a request may include a number of concurrent requests and a maximum number of request after which the service component 122*a*1 stops. In library mode, the number of concurrent requests and the maximum number of request are set to one. When operating in library mode, commands are scrutinized to determine which portion of the library to invoke. Additionally, the commands may require access to analysis components that perform calculations on the network data or output components that format the network data or result of the calculations for presentation. In daemon mode the number of concurrent requests or maximum number of requests is set to infinity. When operating in daemon mode, the client device 122 may accepts multiple requests, and schedule the requests for execution. The daemon may operate in single or multiple daemon mode. In single daemon mode, the number of concurrent request is set to one and the number of request is set to infinity. In multiple daemon mode, the number of concurrent request is to infinity and the number of request is also set to infinity. Unlike library mode which is local to client the device 122, daemon mode enables remote access among other client devices 111, 113, 121, 140 and 150. Remote invocation allows analysis of the network data to be distributed across the client devices 111, 113, 121, 140 or 150**. Accordingly, analysis of the network data may occur on any client device remote from the client device that outputs or initiates the active network measurement. Remote invocation introduces security issues that may be handled via an access control component included in the service component.

The control component **122*a*2 receives a configuration file that defines one or more active network measurements. The control component 122*a*2 parses the configuration file to extract commands and communicates the commands to service component 122*a*1 to invoke the appropriate objects for implementing the active network measurements. The control component 122*a*2 is able to communicate with service components 122*a*1 and other service components on the client devices 111, 113, 121, 140, or 150**.

The foregoing distributed operating environment 100 is illustrative. Furthermore, the skilled artisan understands that embodiments of the present invention may be implemented in many other operating environments.

In another embodiment of the present invention, the extensible computing framework for active network measurements includes sender, analyzer, receiver and output components. These components implement the basic primitives utilized by the active network measurements. The sender component may be utilized to generate and send an appropriate number of probe streams. The analyzer component performs calculations on the network data collected by the probe streams and received by the receiver component. In certain embodiments, the network data may include information on delay and loss. The output component formats and presents the results of the calculation or the network data, if necessary. In some embodiments, the output component triggers the sender component to generate and send additional probe streams. In an embodiment, if the communication network is not congested or the paths are not bottlenecked, additional packets are generated.

Figure 2:
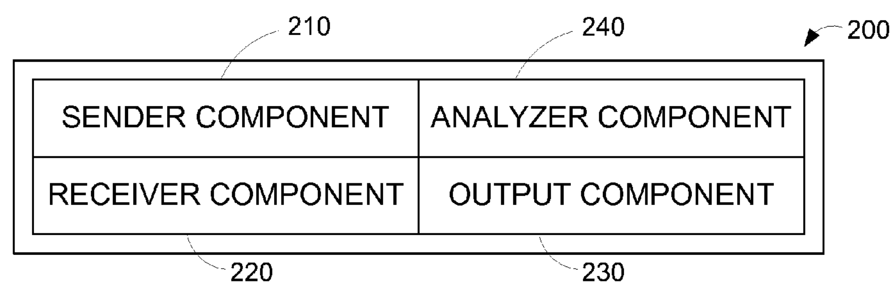
FIG. 2 is a component diagram illustrating an extensible computing framework, according to an embodiment of the present invention.

FIG. 2 is a component diagram illustrating an extensible computing framework 200, according to an embodiment of the present invention. The extensible computing framework 200 provides the basic primitives or application programming interfaces (APIs) for performing active network measurements. The basic primitives include a sender component 210, a receiver component 220, output component 230 and analyzer component 240. In an embodiment of the present invention, the service component of the extensible computing framework provides the basic primitives.

The sender component 210 generates and injects the probes streams into the communication network. The sender component 210 may include a timestamping and event scheduling components that control the frequency at which the probe streams are injected into the communication network. In an embodiment, the sender component 210 may operate in one of three modes associated with the active network measurements. In a first mode or batch mode a collection of probe streams is generated and sent as a batch to the communication network. In a second mode or continuous mode probe streams are continuously sent to the communication network until an interrupt command is received. In a third mode or feedback mode probes streams are generated and additional probe streams are generated based on results of analyzing the network data received from previously generated probe streams.

The receiver component 220 receives the network data collected by the probe streams. The receiver component 220 determines whether the network data should be sent to the output component 230 or the analyzer component 240. If the active network measurement requires further calculations, the network data is sent to the analyzer component 240. Otherwise, the network data is sent to the output component 230.

The output component 230 may receive network data from the receiver component 230 or results from the analyzer component 240. The output component 230 formats the network data or results and stores the network data or result in a file or displays the network data or results on a client device.

The analyzer component 240 receives the network data and performs calculations associated with the active network measurements to generate results. The results may provide communication path properties such as round trip time (RTT), bandwidth, capacity, etc. Accordingly, the extensible computing framework provides the primitives for performing active network measurements on a communication network.

In an embodiment, the probe streams generated by the extensible computing framework are packets that include various fields. In another embodiment, a random number generator is utilized to specify information associated with one or more fields of the packet. The packet may include fields associated with IP, TCP, UDP, ICMP, etc. For instance, the packets may include time to live (TTL) or type of service (TOS) fields that are utilized when collecting network data. After a packet is appropriately configured, the extensible computing framework injects one or more packets onto the communication network.

Figure 3:
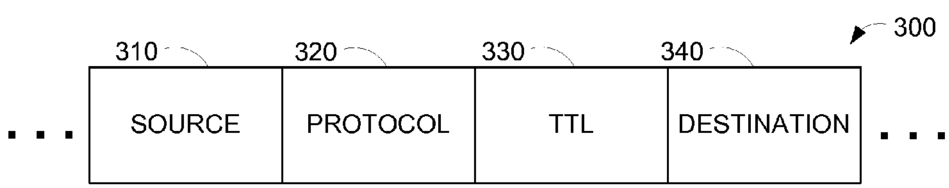
FIG. 3 is a block diagram illustrating an exemplary probe stream, according to an embodiment of the present invention.

FIG. 3 is a block diagram illustrating an exemplary probe stream 300, according to an embodiment of the present invention. The probe stream 300 includes a source field 310, a protocol field 320, a TTL field 330 and a destination field 340. The source field 310 includes the address of the client device that generates the probe stream. The protocol field 320 indicates the protocol of the probe stream. For instance, the protocol may be IP, TCP, UDP or ICMP. In some embodiments, the protocols may include hypertext transfer protocol (HTTP) or real time transport protocol (RTP). The TTL field 330 indicates how long the probe stream will remain active on the communication network. The destination field 340 specifies an address of another client device included on the communication network. The probe stream collects network data, such as delay or loss, and enables the extensible computing framework to determine path properties associated with the communication network. Accordingly, the client device may utilize the extensible computing framework to specify inter-packet sending times, packet sizes, protocol, etc., based on the active network measurements executing on the client device.

In an embodiment of the invention, the configured probe streams are injected on the communication network to collect network data that is returned to one or more client devices for analysis.

Figure 4:
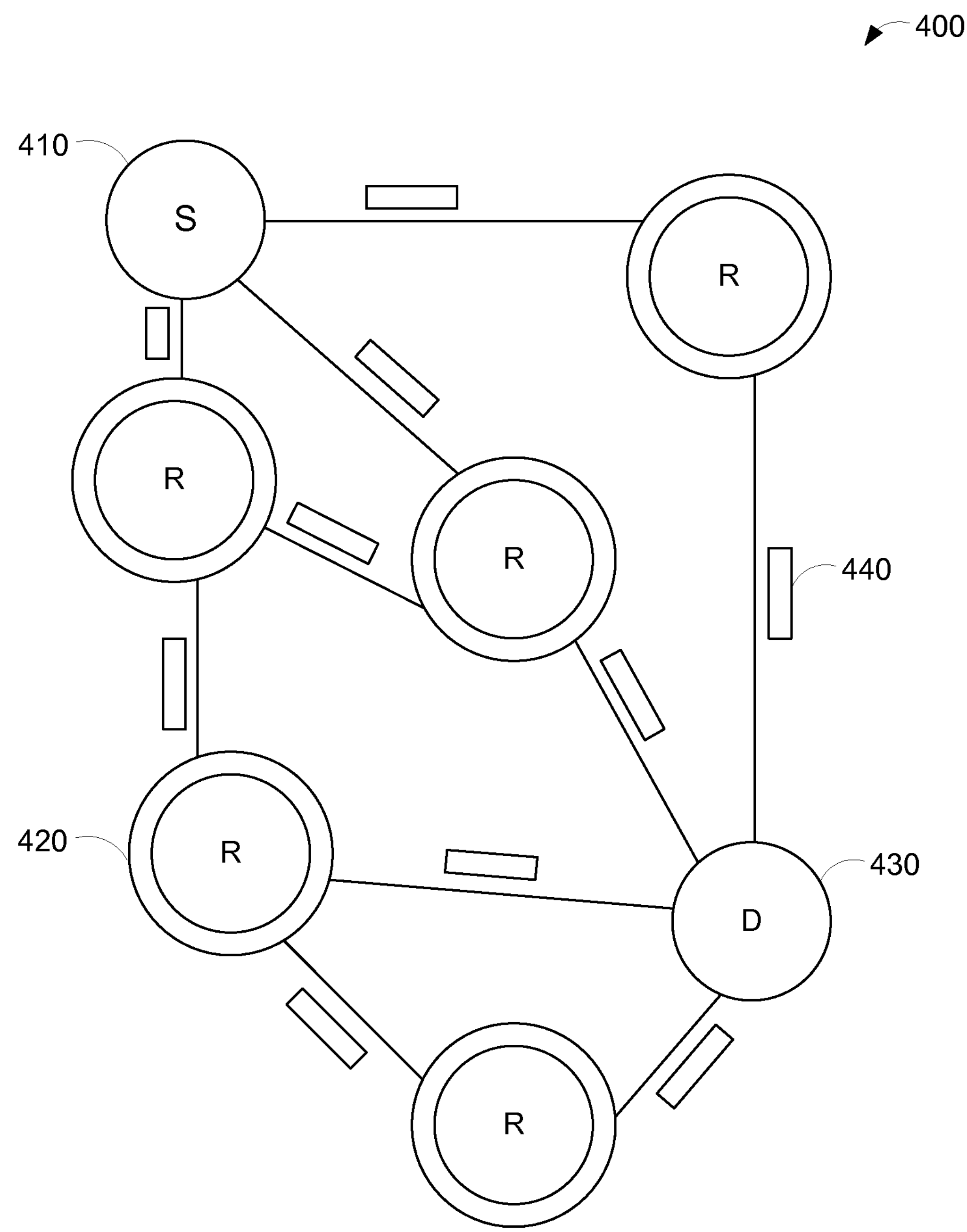
FIG. 4 is a routing diagram illustrating a plurality of probe streams collecting network data, according to an embodiment of the present invention.

FIG. 4 is a routing diagram illustrating a plurality of probe streams 440 collecting network data, according to an embodiment of the present invention. The source client device 410 injects a plurality of probe streams 440 that collect network data between the source client device 410 and destination client device 430. Along the paths to the destination client device, the probe streams 440 collect network data about router devices 420 and link information. The network data collected by the probe streams are then transmitted to the source client device 410 or stored by the destination client device 430.

In an embodiment, the probe streams are generated based on an active network measurement executing on one or more client devices. The active network measurements may be dynamically configured by one or more configuration files. The configuration files include commands that invoke basic primitives provided by the extensible computing framework. The commands include control, service, and probe stream configuration commands. In certain embodiments, the configuration files are parsed to extract the commands associated with generating probe streams and analyzing network data provided by the probe streams. FIGS. 5-11 illustrate an exemplary set of commands utilized by the extensible computing framework.

FIG. 5 is a table illustrating control commands implemented by the extensible computing framework, according to an embodiment of the present invention. The control commands are utilized by the control component and include "connect," "disconnect," "use," "data" and "contdata" commands. Some commands require an argument to be properly invoked. The "connect" command connects to the service component and requires a service-port address as an argument. The "disconnect" command disconnect the control from the service component and does not require an argument. The "use" command allows the transfer of a subsequent command to a client device or local host executing the control component and does not require an argument. The "data" command provides storage for network data associated with one or more probe streams and requires one or more stream identifier arguments. The "contdata" command provides continuous output of all network data received by the client device and requires an argument that specifies an output interface that formats the network data.

FIG. 6 is a table illustrating service commands implemented by the extensible computing framework, according to embodiments of the present invention. The service commands are utilized by the service component and include "stream," "start," "wait," "remove," and "reset" commands. The "stream" command generates a probe stream and requires stream identifier, stream type and a stream protocol arguments. The stream type may include send or receive, and the stream protocol may include, TCP, IP, ICMP, HTTP, etc. The "start" command injects the configured and specified probe streams into the communication network and requires a list of stream identifiers as an argument. The "wait" command injects configured and specified probe streams into the communication network and requires a list of stream identifiers as an argument, but unlike the "start" command, the "wait" command stops when a new command is received by the service. The "remove" command deletes the specified probe streams and requires a list of stream identifiers as an argument. The "reset" command changes the configuration of the specified probe streams and requires a list of stream identifiers. The list of stream identifiers may identify one or more probe streams.

FIG. 7 is a table illustrating a first set of probe stream configuration commands implemented by the extensible computing framework, according to embodiments of the present invention. The first set of probe stream configuration commands are utilized for sending probe streams and include "dest," "idt," "size," "ttl" "tos," "selfish," "port," "type," and "payloadproto" commands. The "dest" command configures the destination address of the probe stream requires a client device address as an argument. The "idt" command configures departure times for the probe stream and requires a random object that randomly specifies a time value as an argument. The "size" command configures the size for the probe stream and requires a random object that randomly specifies a size value as an argument. The "ttl" command configures the TTL for the probe stream and requires a random object that randomly specifies a value as an argument. The "tos" command configures the TOS for the probe stream and requires a random object that randomly specifies a value as an argument. The "selfish" command configures the processor usage for the probe stream and requires an on or off value, such as a Boolean number as an argument. The "port" command configures the sending port for the probe stream and requires a random object that randomly specifies a port value as an argument. The "type" command configures the type for the probe stream and requires a random object that randomly specifies a type value as an argument. The "payloadproto" command configures the payload for the probe stream and requires different data or options that may be stored on the client device as an argument.

FIG. 8 is a table illustrating random number generator commands implemented by the extensible computing framework, according to embodiments of the present invention. The random number generator is utilized to configure portions of the probe stream that require a random number object. The radom number generator creates random number objects configured with commands that include "exp," "unif," "constant," "list," and "trace" commands. The "exp" command generates a random number object that creates values that are exponentially distributed and where the mean of the created values is an argument. The "unif" command generates a random number object that creates values that are uniformly distributed and requires two values, a first value that represents a minimum value and a second value that represents the maximum value of the created values, as arguments. The "constant" command generates a random number object that creates values that are constant and requires a value that represents the constant as an argument. The "list" command generates a random number object that creates values that are distributed based on a list and requires a list of values as an argument. The "trace" command generates a random number object that creates values that are include in a trace file and requires the file location as an argument.

FIG. 9 is a table illustrating a second set of probe stream configuration commands implemented by the extensible computing framework, according to an embodiment of the present invention. The second set of probe stream configuration commands are utilized for receiving probe streams. The second set of probe stream configuration commands include "source," "port," and "type" commands. The "source" command configures the source address of the probe stream and requires an address as an argument. The "source" command is optional. The "port" command configures the receiving port of the probe stream and requires a port number as an argument. The "type" command configures the probe stream type and requires the type as an argument.

FIG. 10 is a third set of probe stream configuration commands implemented by the extensible computing framework, according to an embodiment of the present invention. The third set of configuration commands are utilized for configuring the receive and send probe streams. The third set of probe stream configuration commands include "duration," "maxnum," "staggerstat" and "contdata" commands. The "duration" command configures the longest TTL for a stream and requires a time value as an argument. The "maxnum" command configures the maximum number of packets to send or receive and requires a number as an argument. The "staggerstat" command configures the start time for the probe stream and requires a random object to randomly create a start time as an argument. The "contdata" command configures the probe stream to continuously output data and requires an on or off value, such as a Boolean number as argument.

In an embodiment of the present invention, a scripting interface may be utilized for invoking basic measurement primitives. The scripts may include instruction to send probe stream, receive network data from the probe streams and to analyze the network data. The analysis of the network data may be platform independent and remotely provided. The analysis may be ported via helper files or may be executed on remote client devices. In an embodiment, application or user commands may be utilized when performing analysis on the network data.

FIG. 11 is a screen shot illustrating a script interface 1100 for configuring the probe streams, according to an embodiment of the present invention. The script interface includes a script field 1110, an edit button 1120 and a finish button 1130. The script field 1110 receives configuration commands associated with active network measurements. The edit button 1120 allows an operator to dynamically modify the scripts associated with the active network measurement. The finish button 1130 allows an operator to execute the modified scripts. Accordingly, an active network measurement may be dynamically extended to determine capacities and delays along each hop of a path, to estimate the available bandwidth along a path, or detect bottlenecked links along a path.

In an embodiment of the present invention, active network measurements analyze network data provided by probe streams injected into a communication network. The probe streams provide network data that includes observed delays and losses. The extensible computing framework integrates procedures associated with various active network measurements and provides a simple framework to execute and dynamically alter the active network measurements. Moreover, the extensible computing framework is light-weight and may be executed on a client device to determine, among other things, connection speed.

Figure 12:
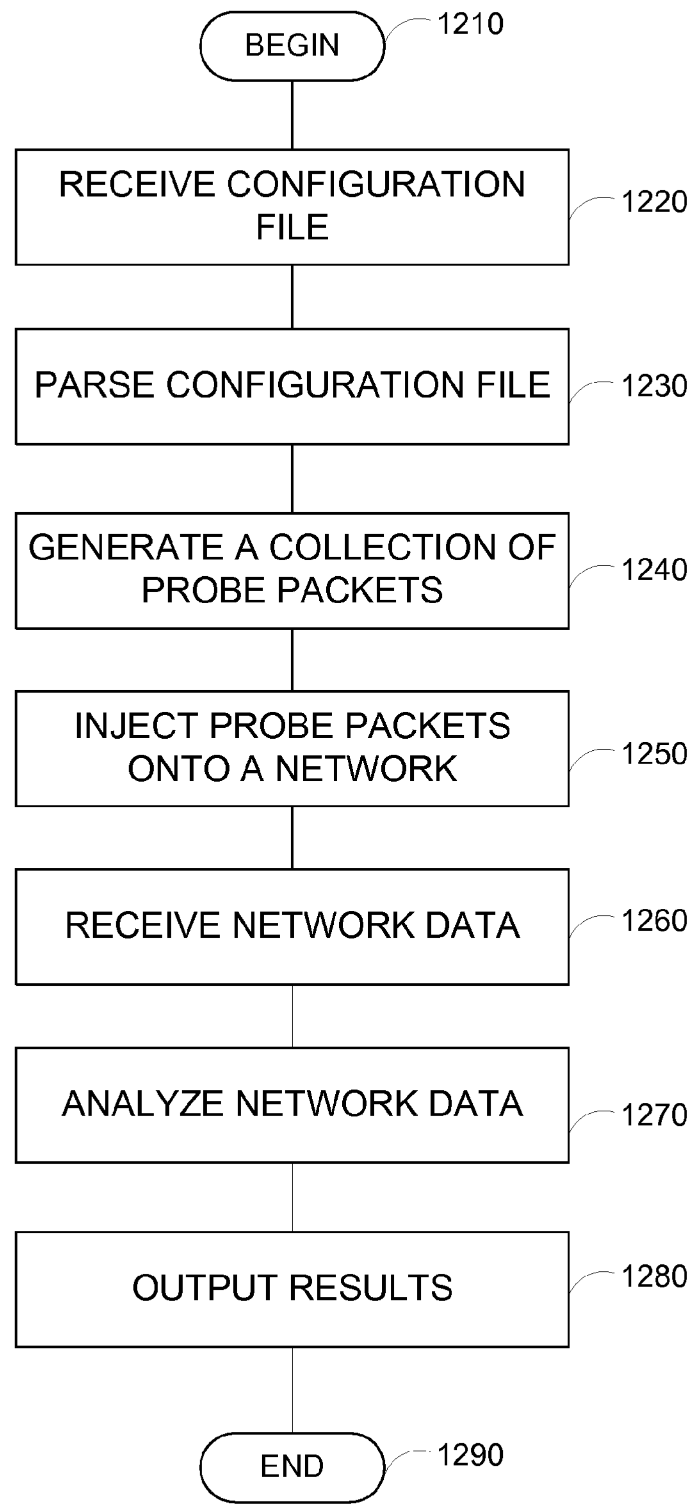
FIG. 12 is a logic diagram illustrating a method for performing active network measurements, according to an embodiment of the present invention.

FIG. 12 is a logic diagram illustrating a method for performing active network measurements, according to an embodiment of the present invention. The method begins in step 1210 when an active network measurement is initiated. In step 1220, a configuration file associated with the active network measurement is received. In step, 1230 the configuration file is parsed to extract one or more commands. In turn, probe packets are generated based on the extracted commands, in step 1240. In step 1250, the probe packets are injected onto a communication network. In step 1260, the network data collected via the probe packets is received. The collected network data is analyzed, in step 1270, to determine end-to-end properties, such as round-trip time, packet loss, etc. In step 1280, results associated with the analyzed network data are formatted and presented to a standard output interface, such as a display, file, etc. The method ends in step 1290.

In summary, an extensible computing framework simplifies implementation, maintenance, porting and debugging of active measurement techniques. The inherent modularization associated with the extensible computing framework maximizes code reuse, simplifies portability and provides immediate access to updated active network measurements. The extensible computing framework provides basic primitives associated with active network measurement and a flexible environment to invoke them. The scripts interface and scripts utilized to describe active measurements provide access to a diverse and dynamic collective of active network measurement that become available through the daemon or library associated with the computing framework.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method for active network measurements, the method comprising:

receiving a configuration file having probe stream configuration commands and probe stream injection commands for a plurality of active network measurements, wherein the probe stream configuration commands and probe stream injection commands are selected from a defined set of commands that are used to determine all of the following end-to-end properties: connectivity, capacity, cross-traffic properties, available bandwidth, and queuing delay;

parsing, at a computing device, the configuration file for one or more of the probe stream configuration commands or the probe stream injection commands for the plurality of active network measurements;

configuring a collection of probe streams based at least in part on the probe stream configuration commands, via a single script interface, the probe streams associated with the plurality of active network measurements;

injecting at least a portion of said collection of probe streams into a communication network having a plurality of links based at least in part upon the probe stream injection commands, wherein injecting at least a portion of said collection of probe streams includes batching a collection of packets and transmitting the batched collection of packets across a plurality of links; and receiving network data from at least a portion of said collection of probe streams, wherein the network data is processed to calculate the following end-to-end properties: connectivity, capacity, cross-traffic properties, available bandwidth, and queuing delay.

2. The method of claim 1, wherein at least a portion of said collection of probe streams are randomly generated.

3. The method of claim 1, wherein at least a portion of said collection of probe streams is generated by a mobile device.

4. The method of claim 1, wherein at least a portion of said collection of probe streams include one of transmission control protocol (TCP), internet control message protocol (ICMP) or User Datagram Protocol (UDP) streams.

5. The method of claim 1, wherein injecting at least a portion of said collection of probe streams includes continuously transmitting packets across said plurality of links.

6. The method of claim 1, further comprising generating an output based on analyzed network data.

7. The method of claim 6, further comprising utilizing the output to generate additional probe streams.

8. One or more tangible computer-readable media having computer-useable instructions embodied thereon for performing the method of claim 1.

9. A computer system for active network measurements, the system comprising:

a collection of client devices each having a service component and a control component for active network measurement, wherein:

(a) the control component parses a configuration file for a plurality of active network measurements to extract commands for implementing the plurality of active network measurements, the commands including probe stream configuration commands and probe stream injection commands;

(b) the probe stream configuration commands and probe stream injection commands are part of a defined set of commands that is used to determine all of the following end-to-end properties: connectivity, capacity, cross-traffic properties, available bandwidth, and queuing delay; and (c) the service component receives and performs the commands parsed by the control component;

a single script interface that receives commands for implementing all of the plurality of active network measurements of network data associated with one or more of the collection of client devices, wherein the commands received at the script interface are included in a configuration file, and, when the configuration file is parsed, are used to configure probe streams associated with the plurality of active network measurements; and a communication network connecting the collection of clients through one or more communication links, wherein each client analyzes network data provided in response to the probe streams and calculates the following end-to-end properties: connectivity, capacity, cross-traffic properties, available bandwidth, and queuing delay based on the provided network data.

10. The system of claim 9, wherein the service component is configured to operate in one of a library or daemon mode.

11. One or more client devices executing a lightweight computing framework for extensible active network measurements, the computing framework comprising:

a sending component to generate and inject probe streams associated with active network measurements, based at least in part on probe stream configuration commands and probe stream injection commands parsed from an active network measurement configuration file, the probe stream configuration commands and the probe stream injection commands received into a single script interface for implementing the active network measurements, wherein the probe stream configuration commands and probe stream injection commands in the configuration file are selected from a defined set of commands that is used to determine all of the following link properties: connectivity, capacity, cross-traffic properties, available bandwidth, and queuing delay;

a receiving component to receive network data collected by the injected probe streams;

an analysis component to utilize the network data to estimate link properties for connectivity, capacity, cross-traffic properties, available bandwidth, and queuing delay; and an output component to provide the network data or path properties.

12. The one or more client devices of claim 11, wherein the sending component operates in at least one of a batch, continuous, or feedback mode.

13. The one or more client devices of claim 11, wherein the active network measurement configuration file is defined by a scripting language.

14. The one or more client devices of claim 11, wherein the network data is analyzed on a remote client device.

* * * * *